March 19, 1957 H. C. CLAUSER ET AL 2,785,632

PYROTECHNIC DEVICE

Filed July 29, 1952 4 Sheets-Sheet 1

INVENTORS
Herbert C. Clauser and
BY Robert S. Long
Warren H. F. Schmieding
their Attorney

PYROTECHNIC DEVICE

Filed July 29, 1952

INVENTORS
Herbert C. Clauser and
Robert S. Long
BY Warren H. F. Schmieding
their Attorney March 19, 1957 H. C. CLAUSER ET AL 2,785,632

PYROTECHNIC DEVICE

Filed July 29, 1952 4 Sheets-Sheet 3

INVENTORS
Herbert C. Clauser and
BY Robert S. Long
Warren H. F. Schmieding
their Attorney March 19, 1957 H. C. CLAUSER ET AL 2,785,632

PYROTECHNIC DEVICE

Filed July 29, 1952 4 Sheets-Sheet 4

INVENTORS
Herbert C. Clauser and
Robert S. Long
BY Warren D. F. Schmieding
Their ATTORNEY United States Patent Office 2,785,632

Patented Mar. 19, 1957

2,785,632

PYROTECHNIC DEVICE

Herbert C. Clauser and Robert S. Long, Westerville, Ohio, assignors to Kilgore, Inc., Westerville, Ohio, a corporation of Ohio Application July 29, 1952, Serial No. 301,524

5 Claims. (Cl. 102—37.6)

The present invention relates to a parachute suspended, fuel burning pyrotechnic signal and to the method of projecting the signal and launching the same at a high altitude. The present invention is a continuation-in-part of our copending application Serial No. 776,922, filed September 30, 1947, now Patent No. 2,606,495.

The present invention answers the need for a signal such as a distress signal for lifeboats, which signal can be seen from a distance of many miles.

The signal in its entirety is a unitary structure, of light weight, the outer casing of which functions as a mortar. It is held in the hand at the time of firing the same. A finger actuated trigger ignites a propelling charge which latter effects the discharge of a projectile from the mortar. This projectile will be referred to as a "rocket projectile." The relationship of the propelling charge and the projectile is such that the charge will expel the projectile ten to twenty feet from the mortar. Through rifling, revolving movement is imparted to the projectile, about its longitudinal axis, as it is projected through the mortar. The projectile includes a rocket, a distress signal such as a slow burning powder which may be of the type that functions as a light signal or as a smoke signal; the projectile also includes a parachute for suspending the distress signal. When the distress signal is in the form of a light, it is upward of 20,000 candle power and will burn for at least thirty seconds.

The gaseous discharge jet or jets of the rocket are arranged so as to effect continuing revolving of the projectile about its longitudinal axis. There is a time delay between the initial ignition of the propelling charge and the effective propelling ignition of the fuel of the rocket; the rocket fuel is ignited and the fuel is burning with propulsion action while the projectile is revolving, due to the rifling, and such action preferably takes place while the projectile is being elevated by the force of the propelling charge, the time delay however being such so as to permit the projectile to safely clear the mortar, whereby the operator is in no way subjected to the hot gases or fire being ejected by the rocket.

A second expelling charge is carried within the rocket projectile, which charge is arranged to be ignited, approximately when the rocket projectile reaches its zenith of flight, to expel, from the rocket projectile, what will be referred to herein as a "signal-carrying projectile." This signal-carrying projectile carries therein the distress signal and parachute. The ejection of the signal-carrying projectile from the rocket projectile usually takes place while the rocket projectile is still revolving about its longitudinally axis. Obviously if the projectile is revolving at the time the ejection takes place, revolving movement of the signal-carrying projectile continues. This revolving would tend to foul the parachute cords and the parachute if the signal and parachute are ejected from the signal-carrying projectile while said projectile is still revolving at a high speed. This would result in the parachute not functioning properly. To prevent such fouling, the invention contemplates causing subsiding of the rotating movement of the parachute and signal before subjecting them to free atmosphere. In the preferred embodiment, a delay fuse is carried by the signal-carrying projectile and is ignited by the expelling charge, which ejects the said signal-carrying projectile from the rocket projectile; this delay fuse is arranged to ignite the expelling charge in the signal-carrying projectile after a predetermined length of time i. e., after revolving movement subsides substantially.

Further objects and advantages of the present invention will be apparent from the following description, reference being had to the accompanying drawings wherein a preferred form of embodiment of the invention is clearly shown.

Figure 1:
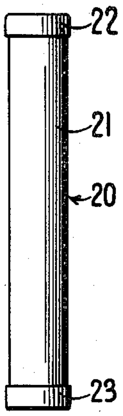
Fig. 1 is a side view in elevation of the improved assembled signal.
Figure 3:
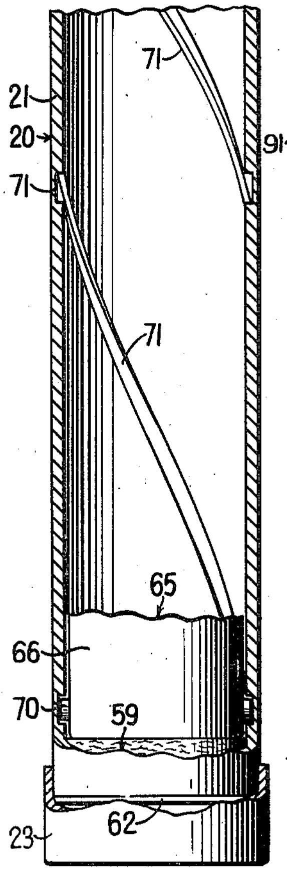
Fig. 3 is a fragmentary view partly in section showing the bottom part of the mortar and the rifling grooves therein and showing the lower end of the rocket projectile.

Referring in detail to the drawings, the signal 20 includes a tube 21 which is closed at the top and at the bottom by frictionally fitting caps 22 and 23, respectively. These caps or covers are preferably formed of sheet metal. Suitable sealing material can be placed at the lips of the caps to effect a seal to prevent the egress of water.

The tube 21 is constructed, preferably, of aluminum or other suitable light weight metal, and in one form of the invention, the tube 21 is approximately 9.50 inches in length with a diameter of approximately 1.65 inches. The tube is provided at the bottom with a base 29, having a recess in the upper surface thereof providing a propelling charge container 30. The base is preferably formed of aluminum, and is threadedly connected to the tube as at 31. A hammer lever 33 is provided with the firing pin 40. This firing pin can be snapped against a primer of percussion cap 45 mounted in the base 29 and in communication with the recess 30, by passage 56. The recess 30 is filled with a black powder, propelling charge 57. A crinoline retainer 62 covers the top of chamber 30 for preventing the powder from being spilled therefrom. A felt washer 59, having a central opening 60, rests upon the base 29, the central opening 60 being aligned with the recess 30. The felt washer 59 functions as a gas check, since the peripheral edge thereof tightly bears against the inner wall of the tube 21. A projectile 65, of the rocket type, is removably positioned within the tube 21.

The tube 21 together with the base 29 form a mortar. This mortar is arranged to eject the projectile 65, upon the burning of the powder 57. The projectile 65 comprises an aluminum tube or casing 66. The lower end of casing 66 carries a base 68 suitably secured thereto, as by pins or brads 69. The projectile 65 rests upon the gas check 59.

A rifle land 70, or lands, are formed on the peripherial surface of the casing 66. Preferably, two of these lands are provided, which extend through the casing 66 and into the base 68. These lands, in the form of pins, are arranged diametrically opposite to one another, and are arranged to engage in diametrically opposite spiral grooves or riflings 71 on the inner surface of the tube or mortar 21.

When the propelling charge 57 is ignited, the projectile 65 will be expelled from the tube 21. Revolving motion will be imparted to the projectile, about its longitudinal axis, by reason of engagement of the pins 70 with the walls of the grooves 71.

Figures 2, 4, 5:
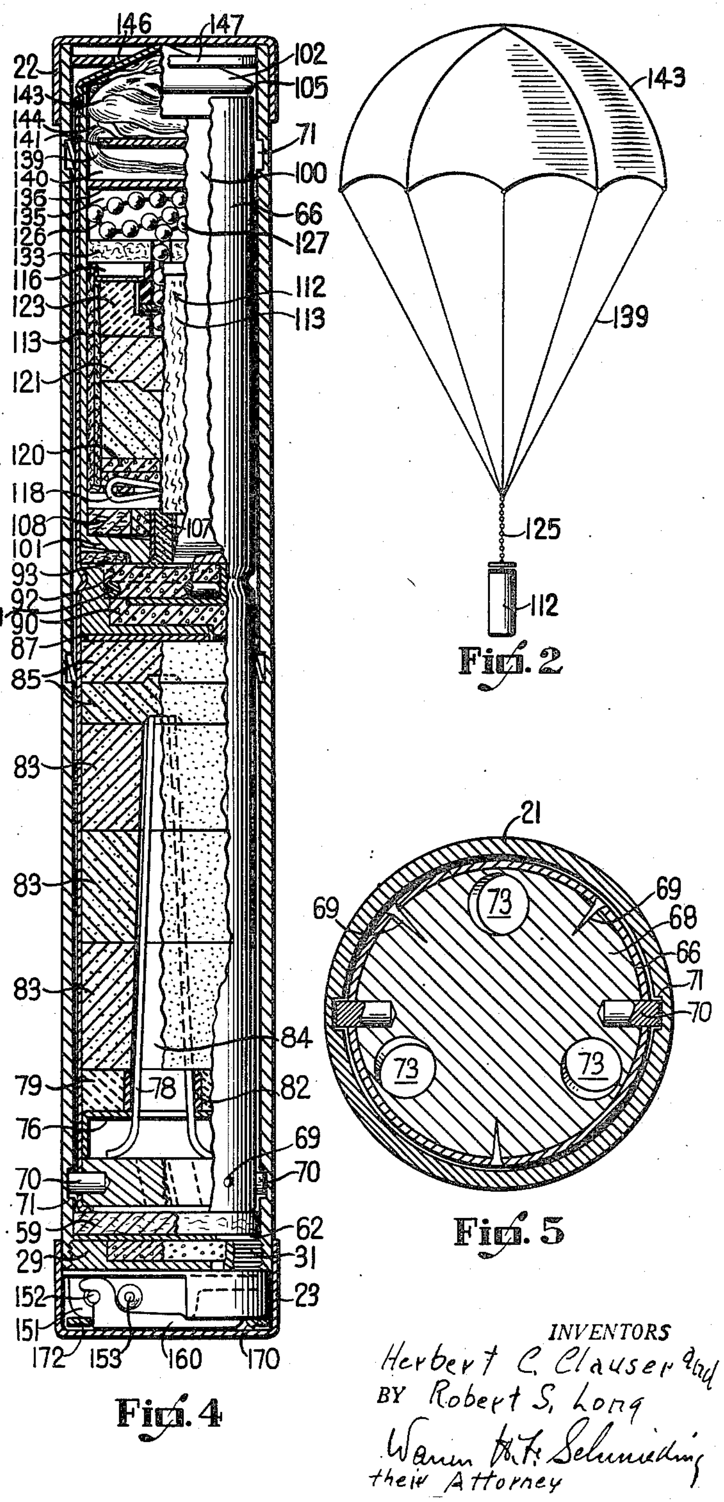
Fig. 2 is a view of the distress signal shown suspended from a parachute.
Fig. 4 is a side view, the mortar being shown in section and parts of the rocket projectile and signal carrying projectile being in section, the sections being taken through the center of the signal.
Fig. 5 is a sectional view taken on line 5—5 of Fig. 4.
Figure 6:
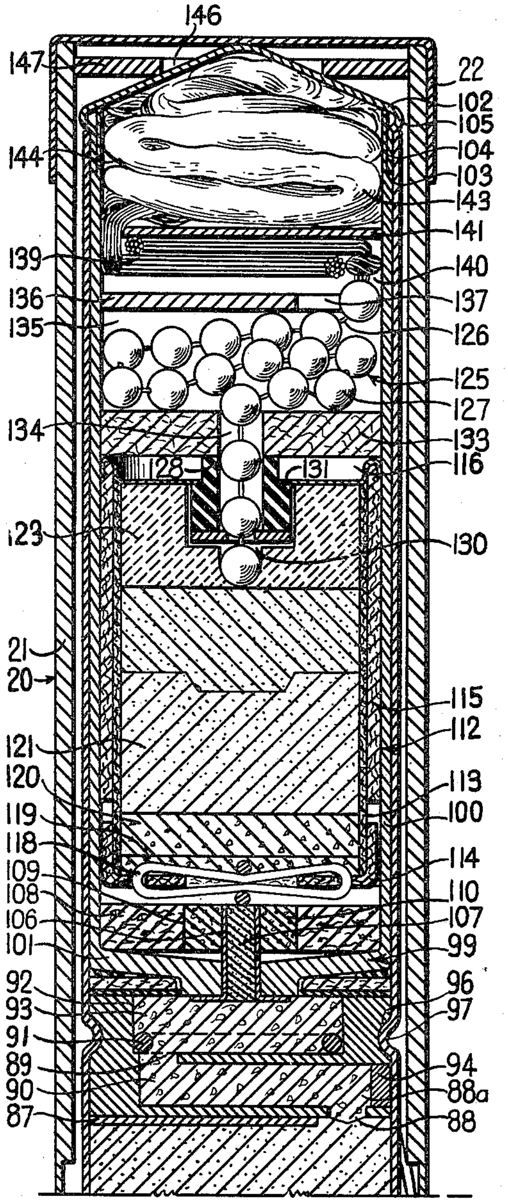
Fig. 6 is a longitudinal sectional view of the upper part of the assembled signal, the section being taken through the center of the signal.

As is more clearly shown in Fig. 5, a plurality of circularly arranged bores 73 are formed in the base 68. These bores extend through the base and are drilled through the latter so as to form an angle of about 12° to the vertical, so that the thrusts of the gases, discharging therethrough, maintain the revolving movement previously imparted to the rocket by the rifling of the mortar. An inverted steel cup 76, having a central opening in the top thereof, is disposed above the base 68 and forms therewith a chamber. The lower ends of quick match 78 extend into this chamber and are arranged to be ignited by fire, which passes upwardly through the openings 73 in the base 68. It will be understood that when the powder 57 is ignited, the fire will burn through the crinoline cover 62 and through the openings 73.

A fire clay choke 79, is formed with a central opening and is lined with a copper ring 82. The ring 82 prevents the clay from crumbling into the central opening. Three charges or pellets 83 of pressed rocket fuel are supported, one above the other on the choke 79. These pellets are each provided with a central opening 84. The quick match extends upwardly through the ring 82 and through the central openings 84 of the pellets 83. Two impervious pellets 85 are mounted above the topmost pellet 83, and the quick match 78 extends to the bottom of the lower of these two pellets 85. A cardboard disc 87, having a notch or opening 88 therein is carried on the top side of the uppermost pellet 85. The notch or opening 88 is filled with a transition charge of powder 88*a*.

A cup 86, formed of aluminum, is carried above the cardboard disc 87. The bottom of the cup 86 is provided with a horizontally extending opening 89, which communicates at one end (through a right angle turn) with the opening 88 in the disc 87, and which communicates with the other end (through a right angle turn) with a recess or chamber 92, formed in the upper part of the cup. This chamber 92 is filled with an expelling charge of black powder 93. Passage 89 is packed with black powder 90, so as to form a delay fuse, which when ignited, through the opening 88, from the burning rocket fuel and transition charge 88*a*, will burn for a period of approximately four seconds before reaching the powder 93 in chamber 92. The lower peripherial portion of the chamber 92 carries quick match 91 for effecting more uniform burning of the powder 93. The horizontally extending opening 89 is drilled from one peripherial edge of the cup 86, and then the end of the hole is closed by a plug 94. The peripherial surface of the cup 86 is formed with an angular groove 96; the tube 66 is provided with a crimp 97 snugly embracing the groove 96 to hold the cup 86 tightly in position.

The signal-carrying projectile 67 comprises an aluminum casing 99 including a tubular section 100, and an integrally formed base 101. This one piece casing 99 is preferably formed of aluminum or other suitable light weight material. The casing further includes a metallic cap 102. The upper end of the tube 100 is undercut slightly longitudinally as at 103 and the circular flange 104 of the cap 102 snugly fits between the undercut portion 103 and the inner upper surface of the tube 66. At the junction of the top portion of the cap 102 and the flange 104 thereof, the cap 102 is provided with a bead 105, which is pushed down upon the upper edge of the tube 100. A suitable sealing compound can be placed at the junction of the cap 102 with the tube 66 so as to prevent the ingress of water.

The central portion of the base 101 of the projectile casing 67 is drilled to receive a tight fitting eyelet 106, which eyelet extends above the bottom wall of the base 101, and is filled with a relay charge of powder 107. This powder is packed within the eyelet 106 and functions not only as a relay charge but also as a delay fuse.

A felt washer forming a gas check 108 is carried by the base 101, and is located in the extreme bottom of the projectile case 99, the opening 109 within the washer 108 being filled with an expelling charge powder 110.

The flare or distress signal 112, which may be formed of powder material which produces light of any desirable color or which produces smoke, rests upon the washer 108. The distress signal includes cartridge including a cardboard casing having a tubular inner section 113, which is closed by a cap 114 at the bottom, and an outer cylindrical section 115 formed of cardboard. A metallic cap 116 has its peripherial edges crimped over the tube 115.

Quick match 118 projects through the cap 114 and is subjected to the fire of the expelling charge 110. An ignition charge 119 is disposed above the quick match 118 and the bottom wall of the cap 114 for effecting ready ignition of a first fire charge 120. This fire charge causes the ignition of the bottom of the lowermost pellet of the signal pellet charge 121. The uppermost pellet 121 of the signal charge is covered by a fire clay wall 123.

It will be seen that when the expelling charge 93, below the projectile 67 burns, the delay fuse 107 will be ignited simultaneously with the ejection of the projectile 67 from the tube 66 of the rocket projectile. Then after a predetermined length of time, the delay fuse 107 will burn through to the expelling charge 110 to eject the signal cartridge 112 from the projectile casing 99. The charge 110 will ignite the priming charge 118 and through the sequence of the ignition charge 119, first fire charge 120, the lowermost signal pellet charge 121 will be ignited.

The lower end of a chain 125 is anchored within the fire clay 123. The chain 125 includes a plurality of wire links 126 and balls 127, each end of a link 126 being swivelly connected with a ball. A flexible eyelet 128, formed of rubber or the like, surrounds the second lowest of the balls 127, and extends through the metallic cap 116 of the cartridge 112. A ring 129, having a central opening somewhat smaller in diameter than that of the balls 127, is interposed between the two lowermost balls. This ring is carried by the bottom of eyelet 128 for fastening the lower end of the chair 125 to the eyelet. The lower end of the eyelet 128 extends within a recess 130 in the upper part of the fire clay wall 123. A horizontally extending shoulder 131 on the eyelet 128 engages the under side of the cover 116 to prevent the withdrawal of the eyelet from its position within the recess 130. A felt washer 133, forming a gas check, is carried on the top of the cartridge 112 and the chain 125 extends through the central opening 134 thereof. The chain 125 is looped about and stored in a chamber 135 formed above the washer 133. The top wall of this chamber comprises a disc 136 of cardboard or the like, which is frictionally held in position spaced above the wall of the washer 133. The peripherial edge of the disc 136 is notched at 137 for receiving the upper end of the chain 125. Parachute lines or cables 139 are connected to the upper end of the chain 125 and are stored in a chamber 140, which chamber is disposed above the disc 136. The upper part of chamber 140 is closed by a frictionally fitting cardboard disc 141. The peripherial edge of the disc 141 is notched as at 142 to provide a passage for the lines 139. A parachute 143 is stored in the chamber 144, which chamber has as its bottom wall the disc 141 and as its top wall the cap 102.

When the expelling charge 110 of the projectile 67 explodes, it will force the cartridge case 112, the washer 113 and everything thereabove out of the tube 100, the parachute 143 forcing the cover of the cap 102 off of the tube 100. The discs 136 and 141 being notched will be thrown away from the chain 125 and chords 139 respectively.

The rocket projectile 65 fits somewhat loosely within the mortar 20, and in order to prevent rattling of the projectile 65 in the mortar, the cap 102, at the end of the projectile 65 is tapered upwardly in the form of a cone, and projects through an opening 146 in a washer 147 formed of cardboard or similar material. This washer is frictionally held in position in the upper part of the tube 21 of the mortar 20.

The propelling charge 57 in the mortar 20 is sufficient only to substantially clear the mortar i. e. project the projectile 65 some ten to twenty feet. The recoil from this small amount of propelling charge can be readily withstood by the operator, holding the mortar in his hand. Due to the rifling 70 and 71, a revolving motion will be imparted to the rocket projectile 65 about its longitudinal axis. Fire from the propelling charge 57 passes through the openings 73 in the base 68 and ignites the quick match 78. The quick match 78 will ignite the rocket fuel throughout the hollow length thereof. After the rocket projectile leaves the mortar, and preferably before the momentum of propelling force of the gun powder is expended, the rocket fuel will be burning with propulsion action; at this time the projectile is still revolving, due to the rifling, and such rocket propulsion action preferably takes place while the projectile is being elevated by the force of the propelling charge, the time delay, however, being sufficient so as to permit the projectile to safely clear the mortar; in this manner, the operator is in no way subjected to the hot gases or fire being ejected by the rocket.

In the preferred embodiment, sufficient rocket fuel is contained within the rocket to project the projectile 65, 1500 to 2500 feet upwardly. The holes 73 in the base 78 being inclined, from the longitudinal, effect a continuing and increased rate of revolving of the projectile 65, the revolving being in the same direction as that imparted thereto by the rifling.

The delay fuse 90 is ignited by the rocket fuel just prior to the consumption of the rocket fuel. The momentum, however, imparted to the rocket projectile by the burning fuel, carries the rocket projectile upwardly for a period of approximately four seconds. The expelling charge 93 is then ignited to expell the projectile 67 when the rocket projectile reaches approximately its zenith of flight.

The rocket projectile 65, including the rocket fuel, the cup 86 and the ignition and expelling charges therein, and the projectile 67, may be considered as an assembly, and the signal-carrying projectile 67 including the pyrotechnic cartridge 112, the delay fuse, the expelling charge, the parachute, chain and line may be considered as a subassembly.

Due to the high speed of revolving of the projectile, necessary to maintain the direction of flight of the projectile, the projectile is still rotating when it reaches the zenith of its flight. Obviously, the signal-carrying projectile 67 will also be revolving about its longitudinal axis at the time it is ejected from the mortar. To prevent the fouling of the parachute, at the time it should open, the expelling of the parachute and the pyrotechnic cartridge is delayed until the revolving movement of the projectile 67 has subsided sufficiently to materially prevent such fouling i. e. the pyrotechnic cartridge 112 and the parachute 142 is not ejected from the projectile case 99 at the time that the signal-carrying projectile 67 is expelled from the rocket projectile 65. The delay fuse 107 can be so constructed as to give any desired delay between the time of the expelling of the projectile 67 from projectile 65, and it has been found that by the use of the swivel type of chain 125 that the parachute will not foul when the turning movement is allowed to subside for a period of two or three seconds.

Thus by virtue of the present invention a substantially fool-proof pyrotechnic distress signal can be projected upwardly for several thousand feet by a mortar which may be held in the hand. Consequently a distress signal has been perfected that can be seen for a distance of many miles.

The base 29 forms a breech block carrying the percussion cap 45. This base is provided with two downwardly extending webs 151 arranged parallel to one another. These webs are drilled transversely to receive pins 152 and 153. A hammer lever 33 is fulcrumed on pin 153. The end of the lever carries a hammer 155 having an upwardly extending firing pin 40. This pin 40 is arranged to engage the percussion cap 45. A coil spring 158 is wound about a tube 159 carried on the pin 153. This coil spring normally urges the lever 154 in a counterclockwise direction as viewed in the figures.

Figure 11:
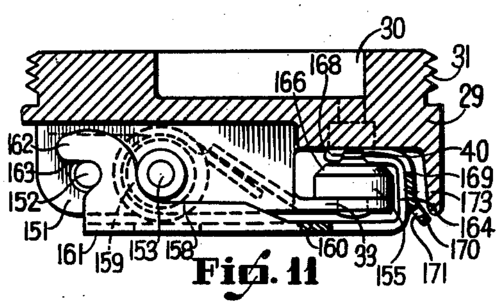
Fig. 11 is a sectional view taken on line 11—11 of Fig. 12.
Figure 13:
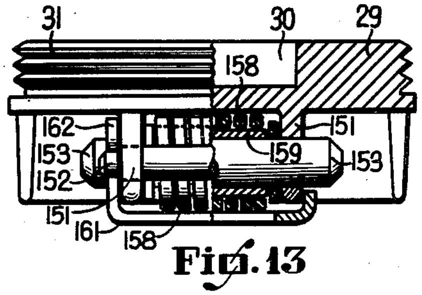
Fig. 13 is a view partly in section, the section being taken on line 13—13 of Fig. 12.
Figure 12:
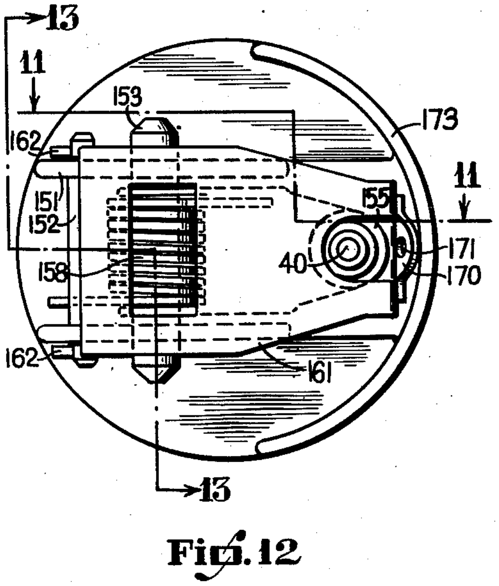
Fig. 12 is a bottom plan view of the mechanism shown in Figs. 8 and 11.
Figure 14:
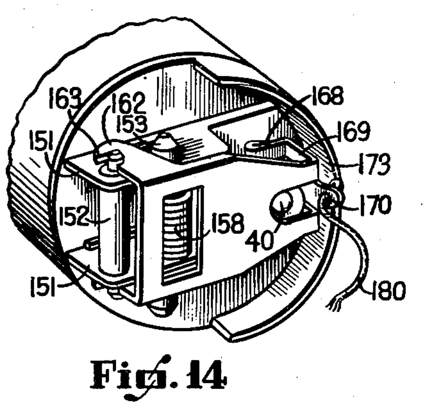
Fig. 14 is a perspective view of the hammer looking upwardly and at an angle.

A trigger lever 160, having the main body portion 161 thereof lying below the lever 154, is provided with a pair of upwardly extending ears 162. These ears straddle the webs 151 and are notched as at 163, which notches straddle the pin 152. The right end of lever 160 is in the form of a hook 164; a portion 165 of this hook extends about the extreme right end of the lever 154 and hammer 155. The hook 164 also includes a bifurcated upper portion 166, the tines of which straddle the pin 45. The hook 164 includes bent back portions 168 and 169 complementing the portions 166 and 165, respectively. The double thickness of the metal, that is the portions 166 and 168, when in position as shown in Fig. 11, hold the pin 40 out of engagement with the percussion cap 56. The portion 169 merges into an outwardly extending section 170 having an opening 171 for fastening a cord or cable 180.

Figures 8, 9, 10:
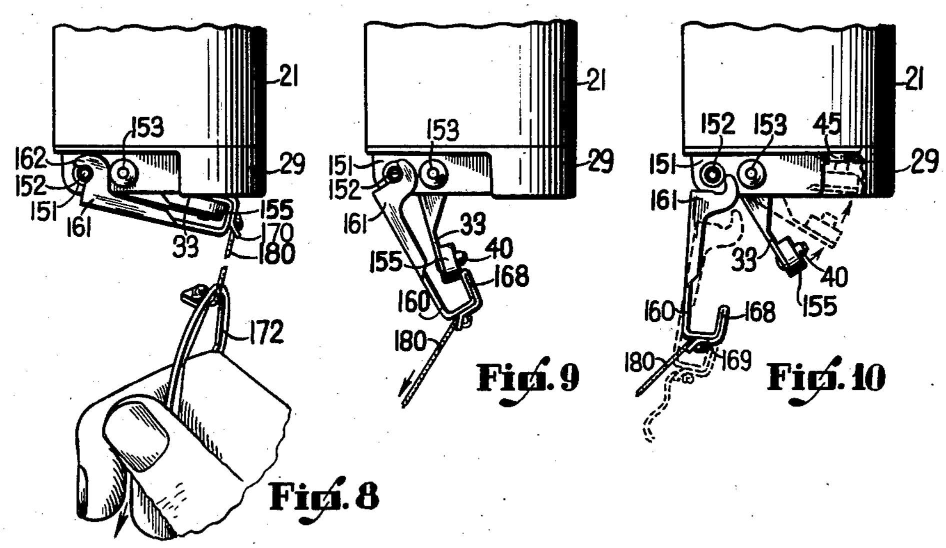
Fig. 8 is a front view in elevation of the gunlock, showing an operator starting the cocking operation.
Fig. 9 is a view similar to Fig. 8 but showing the position of the hammer lever just prior to it being released by the trigger lever.
Fig. 10 is a view similar to Figs. 8 and 9 but showing the hammer lever in released position.

To fire the percussion cap 45, the cord is pulled downwardly, as is seen in Figs. 8 and 9, and since the lever 160, through the hook 164, is in engagement with the upward side of the hammer 155, lever 154 will be moved downwardly or in a clockwise direction about its pivot 153. Since the pivotal points of levers 154 and 160 are on different centers, the relative position of the hook 164 and the hammer 155 will change, that is the hook portion 166 will slide radially outwardly from the hammer 155. The relationship of the levers and pivots is such that when the lever 160 is moved approximately 90°, the end portion 166 of the hook 164 will slide off of the extreme end of the hammer 155. The lever 154 will then be under the control of the spring 158 which will move the lever 154 in a counterclockwise direction and the pin 40 of the hammer 155 will strike the percussion cap 45 for firing the same.

The width of the ears 162 intermediate the pins 152 and 153 is such that the pin 153 prevents lateral inward movements of the lever 160 whereby the pin and ears are maintained in fulcrum relation through the notch 163. However, after the hook slides off of the hammer 155, at which time the notches 163 are extending upwardly, the entire lever 160 is pulled away from its pin 152 (see Fig. 10). In this manner, no jerking motion will be imparted to the distress signal by the operator as he pulls on the cord to trip the trigger. In other words the operator gently pulls on the cord until the gunlock operates and this steady pull does not disturb the position of the other hand of the operator who is holding the mortar.

Figure 7:
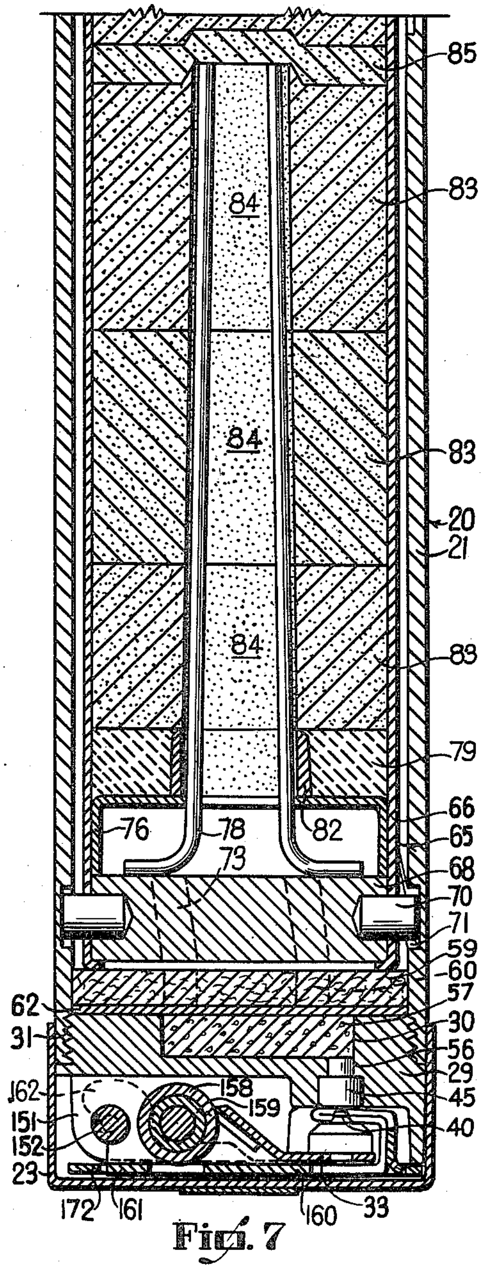
Fig. 7 is a longitudinal sectional view of the lower part of the assembled signal, the section being taken through the center.

A semi-circular flange 173 extends about the hammer 155 and this flange 173 together with the webs 151, provide a shield for the percussion cap which may tend to backfire. The end of the cord 171 is fastened to a ring 172 through which the operator manipulates the cord 171. This ring and cord may be stored within the cap 23 as is clearly shown in Fig. 7.

Figure 15:
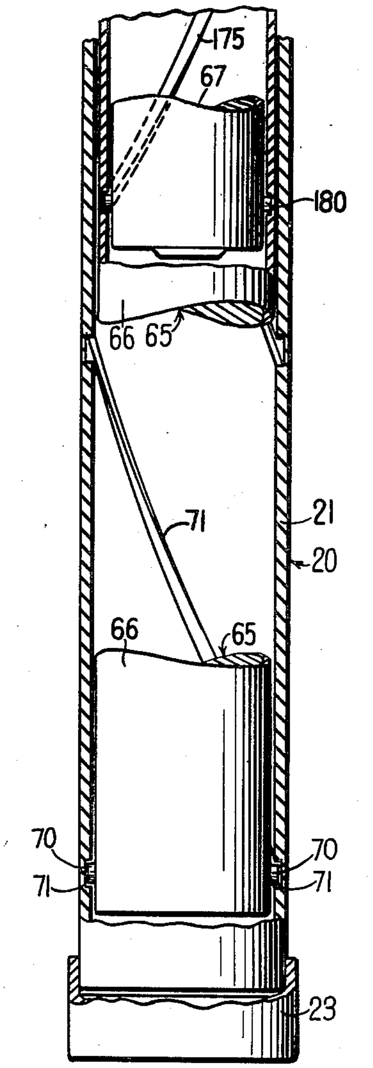
Figs. 15 and 16 are fragmentary side views, partly in section showing another embodiment of the invention.
Figure 16:
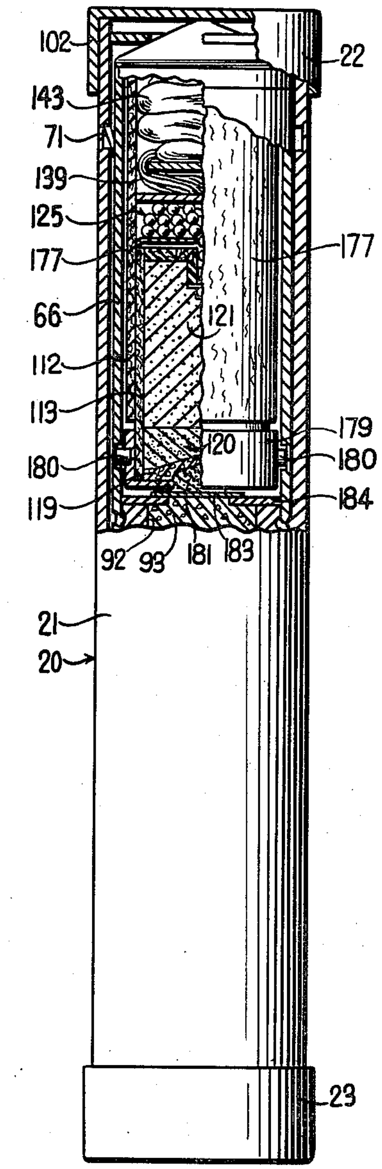

Referring now to the embodiment shown in Figs. 15 and 16. The upper part of the cylindrical casing 66 is provided with a plurality of spiral grooves 175 which terminate, at the lower end, directly above the cup 86 and extend upwardly throughout the full length of the cylinder 66. These grooves 175 are spiraled counter to the spirals of grooves 71 in the mortar tube 21. Preferably two spiral grooves 175 are provided and are disposed diametrically opposite one another.

The signal-carrying projectile 67, in the embodiment shown in Figs. 15 and 16, comprises an outer cylindrical casing 177, which is preferably formed of cardboard. This cylindrical casing surrounds the pyrotechnic signal 112, the chain 125, the parachute lines and cables 139, and the parachute 143. The upper part of this casing 177 and the upper part of the cylinder tube 66 are closed by the cap 102, as explained in the other embodiment of the invention.

The distress signal includes the superimposed signal pellets 121 which are surrounded by a cylindrical casing 113, which latter is preferably formed of cardboard. A cap 179 covers the lower end of the casing 113. This cap is preferably formed of light weight metal and has two diametrically opposed and radially disposed lands 180, extending from the periphery of the cap and being arranged to be received by the spiral grooves 175 in the projectile cylinder 66. A priming charge 181, composed of readily ignitable material and in solid form, projects downwardly through a central opening in the cap 179. An ignition charge 119, composed of a train of black powder, is disposed above the priming charge 181 for effecting ready ignition of the first fire charge 120, as previously explained.

As the projectile 67, in embodiments 15 and 16, is ejected from the rocket projectile cylinder 66, the rifling 175, together with the lands 180 will effect a turning of the projectile 67, about its longitudinal axis relatively counter to that of the turning of the cylinder 66, with the result that the turning movement imparted to the projectile 67 by the cylinder 66 will be neutralized or substantially neutralized; this results in the projectile 67 being expelled from the cylinder 66 with little or no turning movement about its longitudinal axis.

A silk parachute is compressed in position within the projectile 67 by the cap 102. Obviously the cap 102 is first pushed out of position as the parachute and signal are expelled from the tube 66. Due to the resiliency of the silk material of the parachute, it will protrude beyond the end of the casing 177, where it will be caught by air current which augment the resilient effect of the parachute to thereby withdraw the parachute and the train of line and chain from the casing 177, with the result that the parachute is free to open and suspend the signal 112.

The ejection of the parachute and signal from its casing, may be delayed as was explained with respect to the embodiment shown in Figs. 1 to 7, through a relay charge of powder 107, however, it has been found that excellent performance has been attained i. e. no fouling of the parachute occurs when the counter spirals are employed. In other words, the primer charge 185 can be directly ignited by the expelling charge of black powder 93 in chamber 92 of the cup 86. In this embodiment, the chamber 92 is covered by a crinoline disc 183 which is reenforced by a washer 184 preferably formed of cardboard.

It will be understood that in all the embodiments, the rocket projectile is still spinning about its longitudinal axis at the time that the expelling charge 93 is ignited. Turning movement of the signal and parachute are substantially subsided at the time that the parachute should open. In the embodiment shown and described with respect to Figs. 1 to 7 inclusive, the resistance offered by the free atmosphere, during the period from the time that the signal-carrying projectile is ejected from the rocket projectile to the time that the signal and parachute are ejected from the casing of the signal-carrying projectile, is sufficient to cause subsiding of the turning, while in the embodiment shown in Figs. 15 and 16 the turning movement of the parachute and signal is caused to subside by the rifling in the rocket projectile.

Thus in any embodiment of the invention disclosed, a parachute suspended signal can be launched several thousand feet above the surface of the earth with the assurance that the parachute will not foul but will function properly.

While the forms of embodiments of the present invention as herein disclosed constitute preferred forms, it is to be understood that other forms might be adopted, all coming within the scope of the claims which follow.

We claim:

1. A pyrotechnic signal comprising, in combination, a mortar including a base and a hollow cylinder secured to the base, the inner wall of the cylinder having a rifled surface; an expelling charge of powder within the cylinder at the base; means carried by the mortar for igniting the powder charge; a rocket projectile assembly including a hollow cylinder telescoping within the mortar cylinder and having a rifle land on the outer surface thereof cooperating with the rifled surface of the mortar cylinder whereby axial turning movement is imparted to the projectile assembly when the latter is ejected from the mortar cylinder by the charge of powder, said projectile cylinder including a base at the lower end thereof having holes extending therethrough, said holes being inclined with respect to the axis of the projectile cylinder, rocket fuel within the lower part of the projectile cylinder in igniting relationship with the powder, said projectile assembly including a signal-carrying projectile comprising a hollow cylinder telescoping with the first named cylinder of the rocket projectile assembly, the cylinder of the said signal-carrying projectile including a base at the bottom thereof, a charge of powder in the latter cylinder directly over the base, a pyrotechnic signal in the bottom of the cylinder of the signal-carrying projectile and above the powder charge in said last named cylinder, a parachute in the upper part of the last named cylinder, means connecting the signal and parachute, a delay fuse in the base of the cylinder of the signal-carrying projectile, said delay fuse being adapted to ignite the powder charge in the latter cylinder after the signal carrying projectile is separated from the cylinder of the rocket projectile assembly to eject the pyrotechnic signal and the parachute from the signal-carrying projectile cylinder; and said rocket projectile assembly including a transverse wall in the cylinder thereof above the rocket fuel, an expelling powder charge above said wall and below the base of the cylinder of the signal-carrying projectile, the delay fuse in the base of the latter cylinder being exposed to the fire of the last mentioned expelling charge, and a delay fuse in said wall exposed to the rocket fuel and said last mentioned expelling charge.

2. A pyrotechnic signal comprising, in combination, a mortar including a base and a hollow cylinder secured to the base, the inner wall of the cylinder having a rifled surface; an expelling charge of powder within the cylinder at the base; means carried by the mortar for igniting the powder charge; a rocket projectile assembly including a hollow cylinder telescoping within the mortar cylinder and having a rifle land on the outer surface thereof cooperating with the rifled surface of the mortar cylinder whereby axial turning movement is imparted to the projectile assembly when the latter is ejected from the mortar cylinder by the charge of powder, said projectile cylinder including a base at the lower end thereof having holes extending therethrough, said holes being inclined with respect to the axis of the projectile cylinder, rocket fuel within the lower part of the projectile cylinder in igniting relationship with the powder, said rocket projectile assembly including a transverse wall in the cylinder thereof above the rocket fuel, an expelling powder charge above said wall, means between the upper part of the rocket fuel and the last mentioned powder for transmitting fire from the rocket fuel to the last mentioned powder, the inner surface of the rocket projectile cylinder being rifled in a direction counter to the rifling in the cylinder of the mortar; a signal-carrying projectile within the rocket projectile and disposed above the last mentioned expelling powder charge, said signal-carrying projectile including a cylinder having a rifle land on the peripheral surface thereof and cooperating with the rifled surface on the interior of the rocket projectile cylinder while being ejected from said latter cylinder to effect axial turning of the signal-carrying projectile relative to the cylinder of the rocket projectile, said signal-carrying projectile including a pyrotechnic signal of slow burning signal powder, a transition charge of ignitable material between the last mentioned expelling powder charge and the signal, a parachute including ropes connected with the signal, said parachute and ropes being disposed within the signal-carrying projectile cylinder and above the signal.

3. A pyrotechnic signal comprising, in combination, a mortar including a base and a hollow cylinder secured to the base; an expelling charge of powder within the cylinder at the base; means for igniting the powder charge; a rocket projectile assembly including a hollow cylinder having an outer surface in telescoping relationship with the inner surface of said mortar cylinder; rifling means for said telescoping surfaces whereby axial turning movement is imparted to the projectile assembly when the latter is ejected from the mortar cylinder by the charge of powder, said projectile cylinder including a base at the lower end thereof having a gas discharge opening therethrough, a gas deflecting surface inclined with respect to the axis of the projectile cylinder, rocket fuel within the projectile cylinder, igniting means for said rocket fuel, said projectile assembly including a signal-carrying projectile comprising a hollow cylinder telescoping with the first named cylinder of the rocket projectile assembly, the cylinder of the said signal-carrying projectile including a base at the bottom thereof, a pyrotechnic signal in the cylinder of the signal-carrying projectile, ejecting means for said pyrotechnic signal carried by said cylinder of said signal-carrying projectile, igniting means for said pyrotechnic signal, time delay means for operating said igniting means subsequent to operation of said ejecting means for said pyrotechnic signal, a parachute in the last named cylinder, means connecting the signal and parachute, and said rocket projectile assembly including a transverse wall in the cylinder thereof above the rocket fuel, and ejecting means for said signal-carrying projectile, said ejecting means being located between said wall and said base of said signal-carrying projectile.

4. A pyrotechnic signal comprising, in combination, a mortar including a base and a hollow cylinder secured to the base; an expelling charge of powder within the cylinder at the base; means for igniting the powder charge; a rocket projectile assembly including a hollow cylinder having an outer surface in telescoping relationship with the inner surface of said mortar cylinder; rifling means for said telescoping surfaces whereby axial turning movement is imparted to the projectile assembly when the latter is ejected from the mortar cylinder by the charge of powder, said projectile cylinder including a base at the lower end thereof having a gas discharge opening therethrough, a gas deflecting surface inclined with respect to the axis of the projectile cylinder, rocket fuel within the projectile cylinder, igniting means for said rocket fuel, said rocket projectile assembly including a transverse wall in the cylinder thereof above the rocket fuel, an expelling powder charge above said wall, means between the upper part of the rocket fuel and the last mentioned powder for transmitting fire from the rocket fuel to the last mentioned powder; a signal-carrying projectile within the rocket projectile and disposed above the last mentioned expelling powder charge, said signal-carrying projectile including a pyrotechnic signal of slow burning signal powder, a transition charge of ignitable material between the last mentioned expelling powder charge and the signal, a parachute including ropes connected with the signal, said parachute and ropes being disposed within the signal-carrying projectile and above the signal.

5. A pyrotechnic signal comprising, in combination, a mortar including a base and a hollow cylinder secured to the base, the inner wall of the cylinder having a rifled surface; an expelling charge of powder within the cylinder at the base; means carried by the mortar for igniting the powder charge; a rocket projectile assembly including a hollow cylinder telescoping within the mortar cylinder and having a rifle land on the outer surface thereof cooperating with the rifled surface of the mortar cylinder whereby axial turning movement is imparted to the projectile assembly when the latter is ejected from the mortar cylinder by the charge of powder, said projectile cylinder including a base at the lower end thereof having holes extending therethrough, said holes being inclined with respect to the axis of the projectile cylinder, rocket fuel within the lower part of the projectile cylinder in igniting relationship with the powder, said rocket projectile assembly including a transverse wall in the cylinder thereof above the rocket fuel, an expelling powder charge above said wall, means between the upper part of the rocket fuel and the last mentioned powder for transmitting fire from the rocket fuel to the last mentioned powder; a signal-carrying projectile within the rocket projectile and disposed above the last mentioned expelling powder charge, said signal-carrying projectile including a pyrotechnic signal of slow burning signal powder, a transition charge of ignitable material between the last mentioned expelling powder charge and the signal, a parachute including ropes connected with the signal, said parachute and ropes being disposed within the signal-carrying projectile and above the signal.

References Cited in the file of this patent

UNITED STATES PATENTS

| | | |
|---|---|---|
| 1,004,172 | Johnson | Sept. 26, 1911 |
| 1,602,037 | Mixsell | Oct. 5, 1926 |
| 1,815,226 | Anderson | July 21, 1931 |
| 2,324,674 | Buchanan | July 20, 1943 |
| 2,329,414 | Nelson | Sept. 14, 1943 |
| 2,442,528 | Beattie | June 1, 1948 |
| 2,449,540 | Albin | Sept. 21, 1948 |
| 2,451,526 | Weiss | Oct. 19, 1948 |
| 2,547,820 | Hammar et al. | Apr. 3, 1951 |